United States Patent
Hatwich (12) 
(10) Patent No.: US 8,448,058 B1
(45) Date of Patent: May 21, 2013

(54) MULTIPLE APPLICATION AND SELECTIVE ANNOTATION CONTENT PRESENTATION SERVICE

(75) Inventor: Joshua A. Hatwich, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 349 days.

(21) Appl. No.: 12/573,684

(22) Filed: Oct. 5, 2009

(51) Int. Cl.
*G06F 17/21* (2006.01)

(52) U.S. Cl.
USPC .......................................................... 715/204

(58) Field of Classification Search
USPC .......................................................... 715/204
See application file for complete search history.

(56) References Cited

U.S. PATENT DOCUMENTS

| | | | |
|---|---|---|---|
| 2004/0024819 A1* | 2/2004 | Sasaki et al. | 709/205 |
| 2010/0325527 A1* | 12/2010 | Estrada et al. | 715/230 |

* cited by examiner

*Primary Examiner* — Laurie Ries
*Assistant Examiner* — Tionna Smith
(74) *Attorney, Agent, or Firm* — Wolfe-SBMC (57) ABSTRACT

Methods and apparatuses are provided which may be implemented to in various computing devices to provide a presentation service through which content from two or more applications running on one or more computing devices may be shared along with selective annotation content.

20 Claims, 5 Drawing Sheets

MULTIPLE APPLICATION AND SELECTIVE ANNOTATION CONTENT PRESENTATION SERVICE

BACKGROUND

Field

The subject matter disclosed herein relates to data processing in a networked computing environment, and more particularly to methods and apparatuses a presentation service for sharing content from multiple applications and annotation input.

INFORMATION

Computer and communication networks allow people to share information over often great distances with a few mouse clicks. Some tools for sharing information allow multiple users to participate in a "web conference" or the like, wherein each participant may sit at his or her own computer and be connected to other participants via the Internet or an intranet. Such tools may, for example, use one or more downloaded or otherwise provided computer applications on each of the attendees' computers and/or one or more web-based applications to allow attendees access to the conference meeting. During such a meeting, a presenter may share at least visual content information with the attendees.

In other settings, for example, an "in-person" meeting, a presenter may use a laptop computer coupled to a large monitor or projector to present information to others.

In either a web-based or in-person meeting, it may be difficult or exceeding infeasible for a presenter and/or other participants to effectively or efficiently present content from multiple, often simultaneously running applications, to the various attendees.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

In accordance with certain aspects, methods and apparatuses are provided which may be implemented in various computing devices to provide a presentation service through which content from two or more applications running on one or more computing devices may be shared. The techniques provided herein allow, for example, for a web or other like network-based presentation service to combine the presented content from two or more applications (or two or more instances of the same application) to be included in a single presentation display along with annotation content. The annotation content may, for example, be provided in one or more sections that overlap at least portions of the presented content. The annotation content may be based on inputs from one or more users and/or scripts and upon display may appear to be drawn over or above the underlying presented content. All or portions of such content in such example presentations may be established in real time based on user inputs and/or scripted inputs, and/or pre-established through earlier recording. Accordingly, in certain implementations, a plurality of users may participate passively and/or actively in a presentation. In other example implementations, a single user may use a presentation service to combine content from a plurality of applications (running locally and/or remotely) into a single presentation display. Here, for example, such applications may be of the same or different types. In certain implementations, scripted input information may be obtained and used to initialize a presentation to a desired state.

Figure 1:
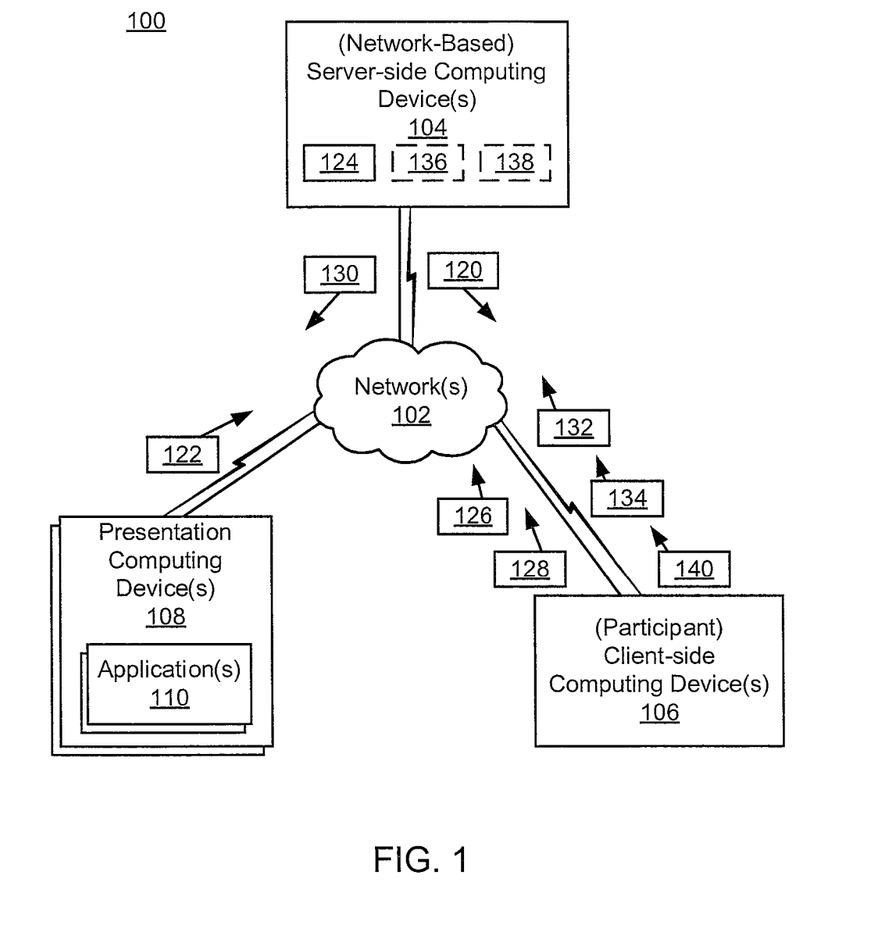
FIG. 1 is a block diagram illustrating an exemplary computing environment to provide a presentation service for sharing content from multiple applications along with selective annotation input, in accordance with certain implementations.

FIG. 1 is a schematic block diagram illustrating an example computing environment 100 having at least one communication network 102 coupled to at least one (network-based) server-side computing device 104, at least one (participant) client-side computing device 106, and at least two applications 110 operatively hosted or otherwise enabled by one or more "presentation" computing devices 108.

It should be noted that while the terms "server-side" and "client-side" are used below to distinguish between and/or among certain computing devices, (e.g., network-based computing devices and participant computing devices, respectively) that may be operatively coupled together to provide a presentation service for sharing content from multiple applications and annotation input, unless stated otherwise herein, in certain implementations such devices need not necessarily operate in any specific server-client relationship. Hence, for example, one or more computing devices provided herein may operate with other computing devices in a peer-based relationship, and/or other like applicable communication protocols and/or distributed computing schemes. Furthermore, in certain implementations, a presentation computing device may comprise a networked-based computing device, a participant computing device, and/or some other type of computing or like electronic device that may operatively communicate through the same or still other applicable communication protocols, distributed computing schemes, and/or the like.

Communication network 102 may be representative of any wired and/or wireless communication and/or other like computing devices that provide data communications between coupled computing devices. By way of example but not limitation, communication network 102 may include a wired or wireless telephone/data network, a wireless cellular network, a satellite network, a wide area network, a local area network, the Internet, an Intranet, and/or any combination thereof and/or the like. In FIG. 1, the coupling of communication network 102 with the various computing devices 104, 106 and 108 is illustratively shown as representing one or more wired and/or wireless communication links.

Server-side computing device 104 representative of any computing device or devices that may be operatively coupled to communication network 102 and operatively enabled to provide data processing supportive of one or more of the presentation display and interactive techniques provided herein. For example, as described in greater detail below, in certain implementations, server-side computing device 104 may be enabled to operatively provide and/or otherwise support a presentation service in which one or more electronic signals representing presentation display interface information 120 may be generated and/or otherwise established and provided to one or more client-side computing devices 106 through communication network 102. Here, for example, such presentation display interface information may comprise and/or otherwise be based, at least in part, on presentation device content 122 associated with at least two applications 110 along with selective annotation content 124.

Presentation computing device 108 is representative of any computing device or devices that may be operatively coupled to communication network 102 and operatively enabled to provide presentation device content 122 to server-side computing device 104 through communication network 102 for use a presentation service. Here, at least a part of presentation device content 122 may include information that may be processed in some manner to establish and/or otherwise affect a rendered displayable image or other like graphical element. To participate in a presentation provided through such presentation service, an application 110 hosted by a presentation computing device 108 may, for example, provide such presentation device content 122 to server-side computing device 104. In certain example implementations, application 110 may be operatively response to one or more presentation device control inputs 130 generated or otherwise provided by server-side computing device 104 to presentation computing device 108 through communication network 102.

By way of further example but not limitation, presentation computing device 108 may comprise one or more of a set-top box, a server-side device, a client-side device, a laptop or desktop personal computer or workstation, a machine controller, a robot, a mobile telephone, a personal digital assistant, a web enabled device or machine, a peripheral device, an appliance, etc. With such variations in mind, "application" 110 may, for example, include any operating system, application, function, module, service, interface, browser, webpage, website, database, and/or other like programmable capability that presentation computing device 108 may be operatively enabled to provide or otherwise support and which is associated with content that may be included in a presentation.

Client-side computing device 106 is representative of any computing device or devices that may be operatively coupled to communication network 102 and operatively enabled to provide data processing supportive of one or more of the presentation display and interactive techniques provided herein. To participate (e.g., actively or passively) in a presentation provided through such presentation service, a client-side computing device 106 may, for example, present all or portions of the received presentation display interface information through a presentation display interface. In certain example implementations, a presentation display interface may include visual information, and possibly corresponding audio information.

Audio information of a presentation display interface may, for example, be reproduced by client-side computing device 106 and/or other like audio processing device (e.g., amplifier, speakers, etc.) coupled thereto. In certain example implementations, client-side computing device 106 may be further operatively enabled to provide audio information (e.g., user voice data from a microphone input device) to server-side computing device 104 through communication network 102.

The visual information of a presentation display interface may, for example, be operatively displayed through a display device (e.g., monitor, projector, etc.). To support passive participation in a presentation, at least the visual information of a presentation display interface may be visually presented using a display device by client-side computing device 106. To support possible active participation in a presentation, for example, at least the visual information of a presentation display interface may be operatively displayed as part of and/or through the use of a graphical user interface (GUI) and/or other like display capability by client-side computing device 106. Thus, for example, user input associated with a presentation display interface may be gathered through one or more user input devices via the GUI or other like display capability and provided to server server-side computing device 104 through communication network 102. For example, as described in greater detail herein, client-side computing device 106 may be enabled to obtain and provide annotation input information 126, presentation device control input information 128, scripted input information 132, recording input information 134, and/or presentation control delegation information 140 to server server-side computing device 104 through communication network 102.

As illustrated in FIG. 1, server-side computing device 104 may generate and/or otherwise obtain one or more scripted input information files 136 and/or one or more recorded presentation files 138. Scripted input information may be used to initialize a presentation display interface and hence presentation to a desired state.

Figure 2:
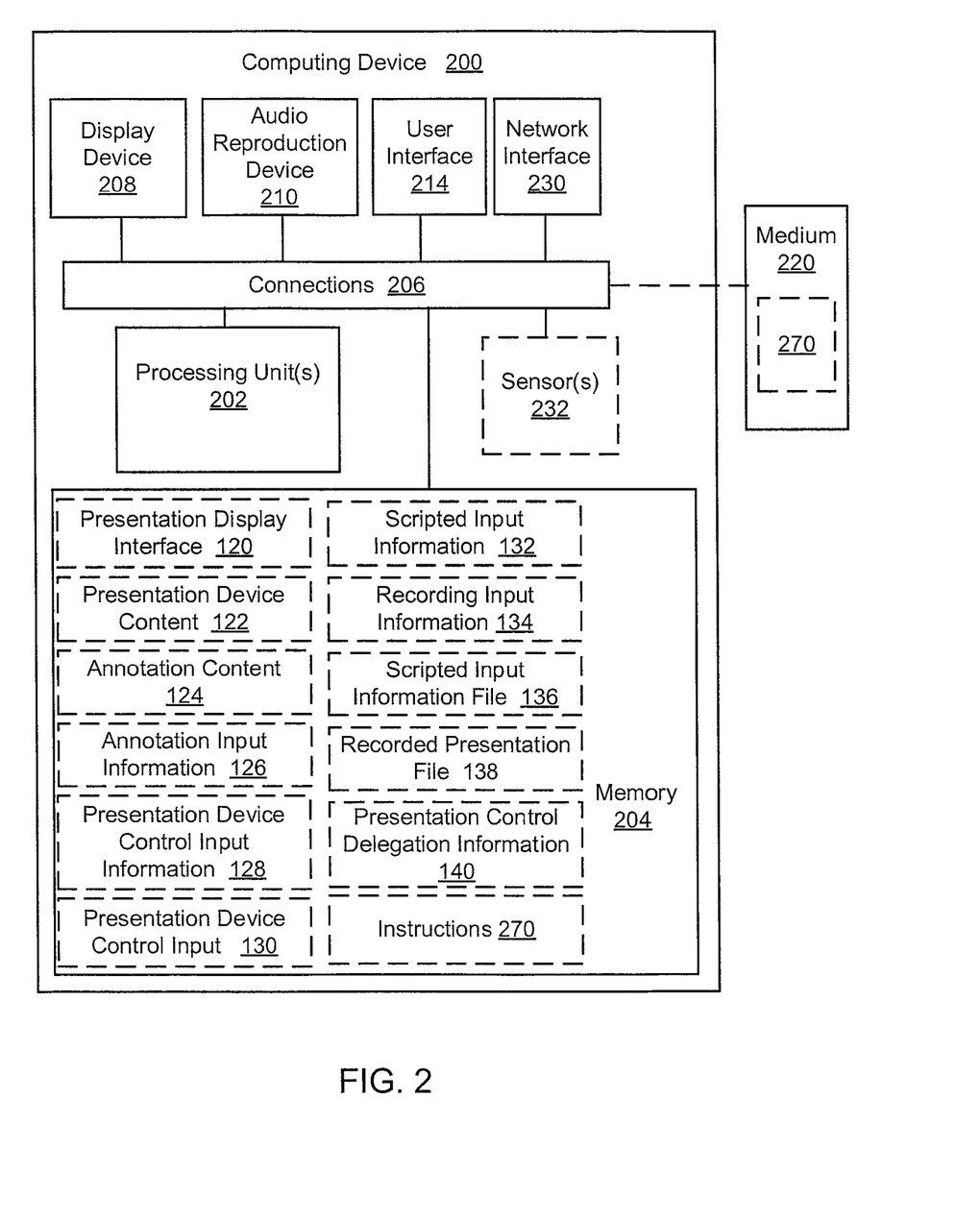
FIG. 2 is a schematic diagram illustrating an exemplary computing device to provide at least a portion of a presentation service for sharing content from multiple applications along with selective annotation input, in accordance with certain implementations.

Reference is now made to FIG. 2, which is a schematic block diagram illustrating certain example functions, components and information that may be provided in a computing device 200 for use in computing environment 100. Here, for example, computing device 200 may be implemented in whole or part as part of server-side computing device 104, client-side computing device 106, and/or presentation computing device 108.

Computing device 200 may comprise one or more processing units 202 operatively coupled to memory 204 through one or more connections 206 (e.g., lines, conductors, fibers, buses, etc.). Here, for example, a processing unit 202 may comprise a microprocessor, micro controller, ASIC, and/or the like. Memory 204 may, for example, comprise a primary memory having a computer readable medium in the form of solid state circuitry such as a random access memory, a read only memory, etc. Memory 204 may, for example, comprise a secondary memory having a computer readable medium 220 on which data may be stored magnetically and/or optically, such as, additional solid state memory, a disk drive, an optical disc, a tape, etc.

In certain example implementations, an article of manufacture may comprise a computer readable medium 220 may be included with and/or otherwise accessed by computing device 200. Computer readable medium 220 have one or more computer implementable instructions 270 stored thereon that in response to being executed by one or more processing units 202 operatively enable computing device 200 to participate in some manner in a presentation service as described herein. As illustrated, all or part of computer implementable instructions 270 may, for example, be stored in memory 204.

Depending on the purpose of computing device 200 within computing environment 100 (FIG. 1), memory 204 may also, at times, include information in the form of data and/or instructions associated with a given presentation. For example, memory 204 may include presentation display device 120, presentation device content 122, annotation content 124, annotation input information 126, device control input information 128, presentation device control inputs 130, scripted input information 132, recording input information 134, scripted input information files 136, recorded presentation files 138, and/or presentation control delegation information 140.

As illustrated in the example of FIG. 2, connections 206 may also couple processing unit 202 and/or memory 204 to a display device 208, an audio reproduction device 210, a user interface 214, and a network interface 230.

Here, for example, display device 208 is representative of any display device and/or other like circuitry operatively enabled to present visual information that may be seen by a user. By way of example but not limitation, display device 208 may include a display interface circuit coupled to a flat panel screen, cathode ray tube, projector, touch-screen, and/or other like display.

Audio reproduction device 210 is representative of any audio reproduction device and/or other like circuitry operatively enabled to present audio information that may be heard by a user. By way of example but not limitation, audio reproduction device 210 may include a sound interface circuit coupled to an amplifier and/or one or more speakers, headphones, etc.

User interface 214 is representative of any user interface circuitry and/or mechanism through which a user may selectively input information operatively associated with at least presentation display interface 120. By way of example but not limitation, user interface 214 may include one or more device interface circuits to enable user input via a keyboard, keypad, mouse or other like pointing/selection device, microphone, camera, etc. Additional inputs may be provided by one or more (optional) sensors 232, such as, for example, a Global Positioning System (GPS) receiver or other like positioning sensor, one or more motion sensors, etc.

Network interface 230 is representative of one or more wired and/or wireless network interface circuits. By way of example but not limitation, network interface 230 may include circuitry comprising one or more of a modem, a transceiver, a cable, a fiber, an antenna, etc., as may be employed to communicate through communication network 102.

Figure 3A:
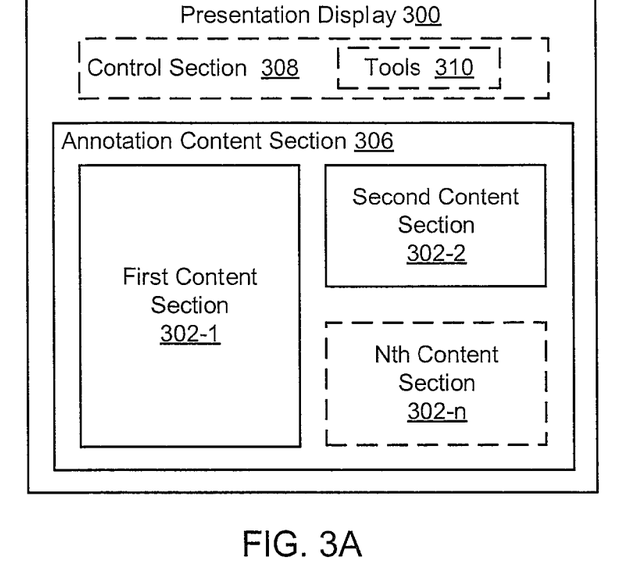
FIG. 3A and FIG. 3B are illustrative depictions showing certain sections of an example presentation display associated with a presentation service for sharing content from multiple applications along with selective annotation input, in accordance with certain implementations.
Figure 3B:
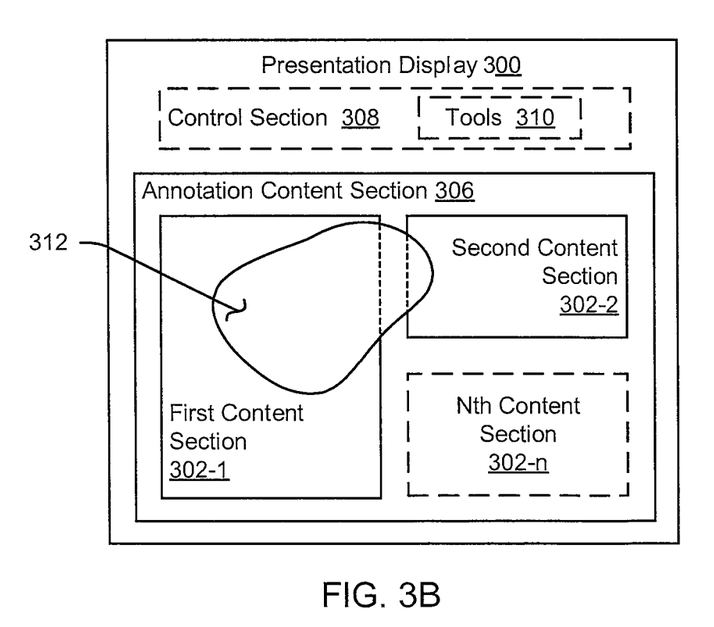

Reference is made next to FIG. 3A and FIG. 3B, which illustrate an example of a presentation display 300. Presentation display 300 may, for example, represent a visually displayed portion of presentation display interface 120 as a user may see such on a display device 208 of a client-side computing device 106 (FIGS. 1-2) during a presentation service.

As shown in the example of FIG. 3A, presentation display 300 may include a plurality of content sections 302 of with at least one content section 302 is associated with a first one of the applications 110 (FIG. 1) and at least one other content section 302 is associated with a second one of the applications 110 being presented. Here, for example, a first content section 302-1 may be associated with content from a first application 110, a second content section 302-1 may be associated with content from a second application 110, and an $n^{th}$ content section 302-$n$ may be associated with content from an $n^{th}$ application (or possibly from the first or second applications) 110. While illustrated here as rectangular boxes, content sections 302 may take on various different shapes, sizes, styles, forms, etc.

In this example, presentation display 300 also comprises at least one annotation content section 306. In accordance with certain aspects of the present description at least one annotation content section 306 may overlap at least a portion of at least first content section 302-1 and second content section 302-2. As shown in the example of FIG. 3A, while annotation content section 306 overlaps all of the content sections 302 it is assumed that the annotation content is not interfering or otherwise currently affecting any of the underlying displayed content sections 302. In other words, annotation content section 306 as illustrated in FIG. 3A may be considered similar to a clear sheet of glass or plastic covering at least portions of the content sections and on which annotation content may appear at some point in a presentation to interfere with or otherwise affect at least a portion of the underlying content sections.

For example, attention is drawn to FIG. 3B in which example annotation content 312 has been included in annotation content section. Here, for example, the underlying content in certain portions of content sections 302-1 and 302-2 is affected in some manner by annotation content 312. By way of example but not limitation, annotation content 312 may include graphical information added by a user of one or more client-side computing devices during a presentation to illustrate or highlight in some manner portions of the underlying content. In other examples, annotation content 312 may include graphical information added by a server-side computing devices during a presentation in accordance with a script and/or possibly while replaying a recorded presentation.

Thus, annotation content 312 may affect underlying content portions in a variety of ways. For example, annotation content 312 may obscure certain portions of underlying content, or conversely obscure other portions of content not underlying annotation content 312. For example, annotation content may define (e.g., isolate, highlight, spotlight, hide, shade, etc.) one or more selected portions of the presentation display, and/or add textual and/or other graphical elements (e.g., text, pointers, circles, boxes, lines, underlines, checkmarks, etc.) to the presentation display. In certain examples, annotation content 312 may affect color, tone, contrast, brightness, intensity, and/or other like aspect of certain portions of underlying content, or conversely affect color, tone, contrast, brightness, intensity, and/or other like aspect of other portions of content not underlying annotation content 312. In certain example implementations, annotation content 312 may relate simulated visual conditions, such as, for example, color-blindness, bright-light viewing, etc., that may demonstrate certain aspects of the underlying or otherwise affected content.

As described in greater detail below, annotation content 312 may, for example, be gathered from user inputs by one or more client-side computing devices 106 and provided to server-side computing device 104 as annotation input information 126 (see FIG. 1). Server-side computing device 104 may, for example, generate annotation content 312 and include such in an updated or current version of presentation display interface 120 which may then be provided to the one or more participating client-side computing devices and/or otherwise captured in a scripted input information file 136 and/or recorded presentation file 138. In this manner, a user may add content to a presentation. Additionally, in certain example implementations, annotation input information may also include corresponding audio information that may also be shared, and/or otherwise recorded.

With reference to FIGS. 3A and 3B, in certain example implementations presentation display 300 may include non-content related sections. By way of example but not limitation, presentation display 300 may include a control section 308 which may allow for user interaction in initiating a presentation, ending a presentation, or otherwise affecting some aspect of a presentation. Thus, control section 308 may include a menu of selectable functions, features, etc. associated with a presentation and/or presentation service. For example, an initial presenting user may initiate a presentation through control section 308. Here, for example, a layout of presentation display may be established and/or otherwise identified. Here, for example, possible other client-side computing devices or users may be invited and/or otherwise granted/delegated certain permission to participate in the presentation in some manner.

Control section 308 may, for example, allow a user to identify the presentation computing devices 108 and/or applications 110. Accordingly, for example, server-side computing device 104, having an established presentation session with the initial client-side computing device, may then establish applicable operable communication with the identified applications 110 that may be used to support the presentation. In certain implementations, applications 110 may be hosted by presentation computing devices 108 (e.g., as shown in FIG. 1), one or more server-side computing devices 104, and/or one or more client-side computing devices 106. For example, a user may identify content for the presentation that may be provided by an application hosted on the user's client-side device 106 and/or the server-side computing device.

Control section 308 may, for example, allow a user to selectively interact with one or more applications 110 via presentation display. For example, a user may gain delegated control over an application 110 and/or content section associated therewith via control section 308. Here, for example, presentation computing device control input information 128 may be provided by a client-side computing device to an application, e.g., via communication network 102 and/or server-side computing device 104 (see FIG. 1). In response, for example, where applicable server-side computing device 104 may provide corresponding presentation computing device control input(s) 130 to an application 110.

With regard to active participation in a presentation, in certain example implementations, control section 308 may allow for presentation control delegation information 140 to be generated based on user input. For example, presentation control delegation information 140 may identify at least one control feature of a presentation display interface that one or more users may control via their respective presentation displays and client-side devices. In certain implementations, presentation control delegation information 140 may be derived from an aggregation of inputs from a group of participants. One or more control features may, for example, relate to control of all or part of the content (visual and/or audio) being presented during a presentation, all or part of the annotation content and/or one or more annotation content sections, access to one or more computing devices and/or applications, control over scripted input information and/or scripted input information files, control over recording input information and/or recorded presentation files, and/or other like aspects relating to the techniques provided herein.

With regard to a user adding content to an annotation content section 306, for example, one or more selectable user interface tools 310 may be provided to support user input associated with annotation content section 306 and/or annotation content 312.

Figure 4:
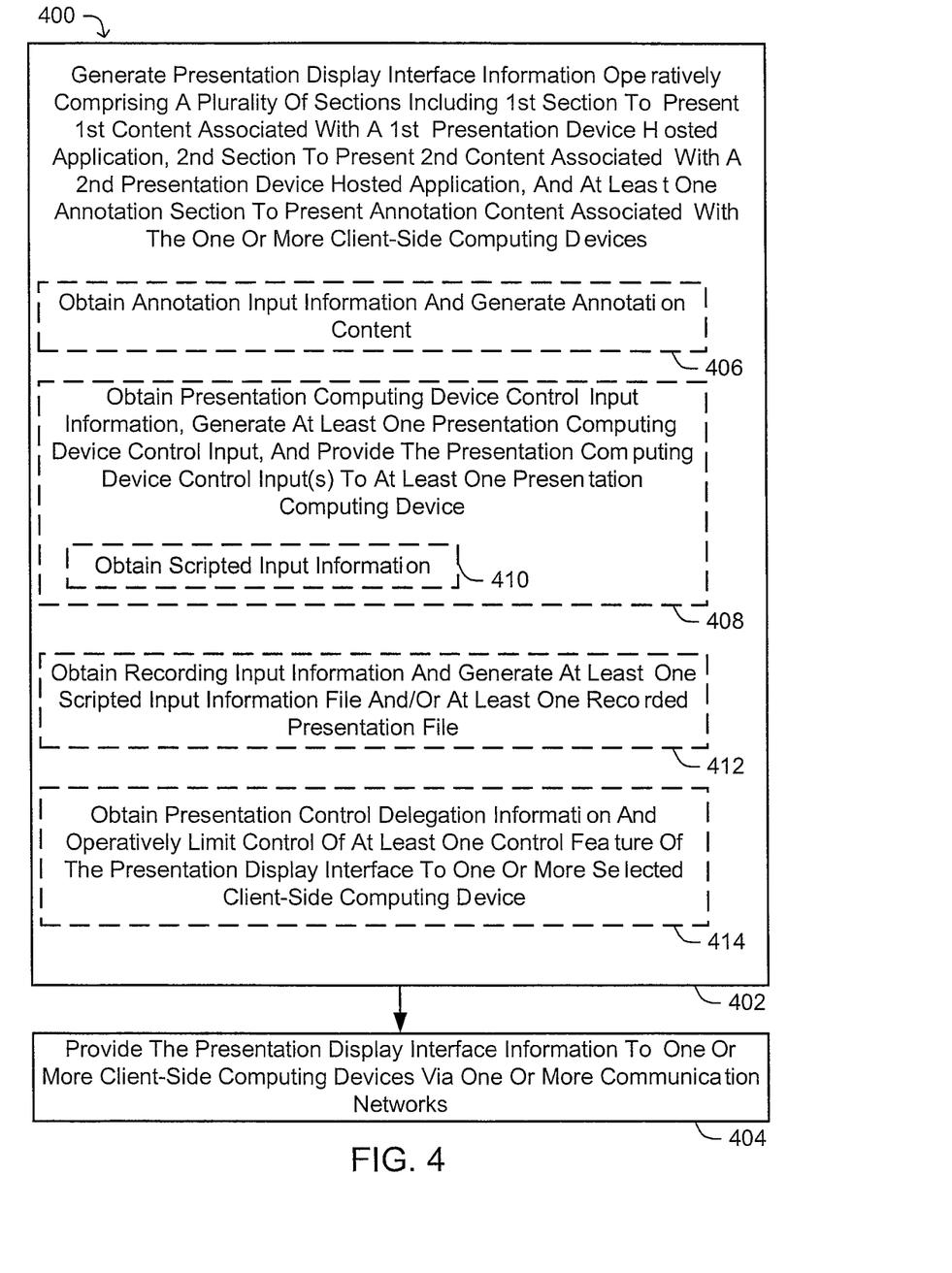
FIG. 4 is a flow diagram illustrating an exemplary process for use in an exemplary server-side or other like computing device to provide at least a portion of a presentation service for sharing content from multiple applications along with selective annotation input, in accordance with certain implementations.

Reference is now made to FIG. 4, which is a flow-diagram illustrating an example process 400 that may be implemented by one or more server-side computing devices, for example, as in FIG. 1.

At block 402, one or more electronic signals representing a presentation display interface may be generated. Here, for example, at least a portion of the presentation display interface may be operatively displayable via one or more client-side computing devices. Such displayed presentation display interface may include a plurality of sections, such as, at least: a first section in which first content associated with a first presentation computing device hosted application is presented; a second section in which second content associated with a second presentation computing device hosted application is presented; and at least one annotation section. Here, for example, the annotation section may selectively present annotation content associated with one or more client-side computing devices and overlap at least a portion of each of the first and second sections.

At block 404, one or more electronic signals representing the presentation display interface may be provided to one or more client-side computing devices via one or more communication networks.

In certain example implementations, at block 406 in block 402, a server-side computing device may obtain one or more electrical signals representing annotation input information associated with the presentation display interface as operatively displayed using at least one of the one or more client-side computing devices and generate one or more electronic signals representing the annotation content based, at least in part, on the annotation input information.

In certain example implementations, at block 408 in block 402, a server-side computing device may obtain one or more electrical signals representing presentation computing device control input information associated with the presentation display interface as operatively displayed using at least one of the one or more client-side computing devices. The server-side computing device may generate one or more electronic signals representing at least one presentation computing device control input associated with at least one of the first and/or second presentation computing devices based, at least in part, on the presentation computing device control input information. The server-side computing device may provide such presentation computing device control input to at least one of the first and/or second presentation computing devices. At block 410, in certain example implementations presentation computing device control input information may comprise scripted input information.

In certain example implementations, at block 412 in block 402, a server-side computing device may obtain one or more electrical signals representing recording input information associated with the presentation display interface as operatively displayed using at least one of the one or more client-side computing devices. Such server-side computing device may, in response to the recording input information, generate one or more electronic signals representing at least one scripted input information file and/or at least one recorded presentation file associated with at least one of a plurality of sections of the presentation display interface.

In certain example implementations, at block 414 in block 402, a server-side computing device may obtain one or more electrical signals representing presentation control delegation information associated with the presentation display interface as operatively displayed using at least one of the one or more client-side computing devices, and in response to the recording input information, operatively limit control of at least one control feature of the presentation display interface to a subset of a plurality of client-side computing devices.

Figure 5:
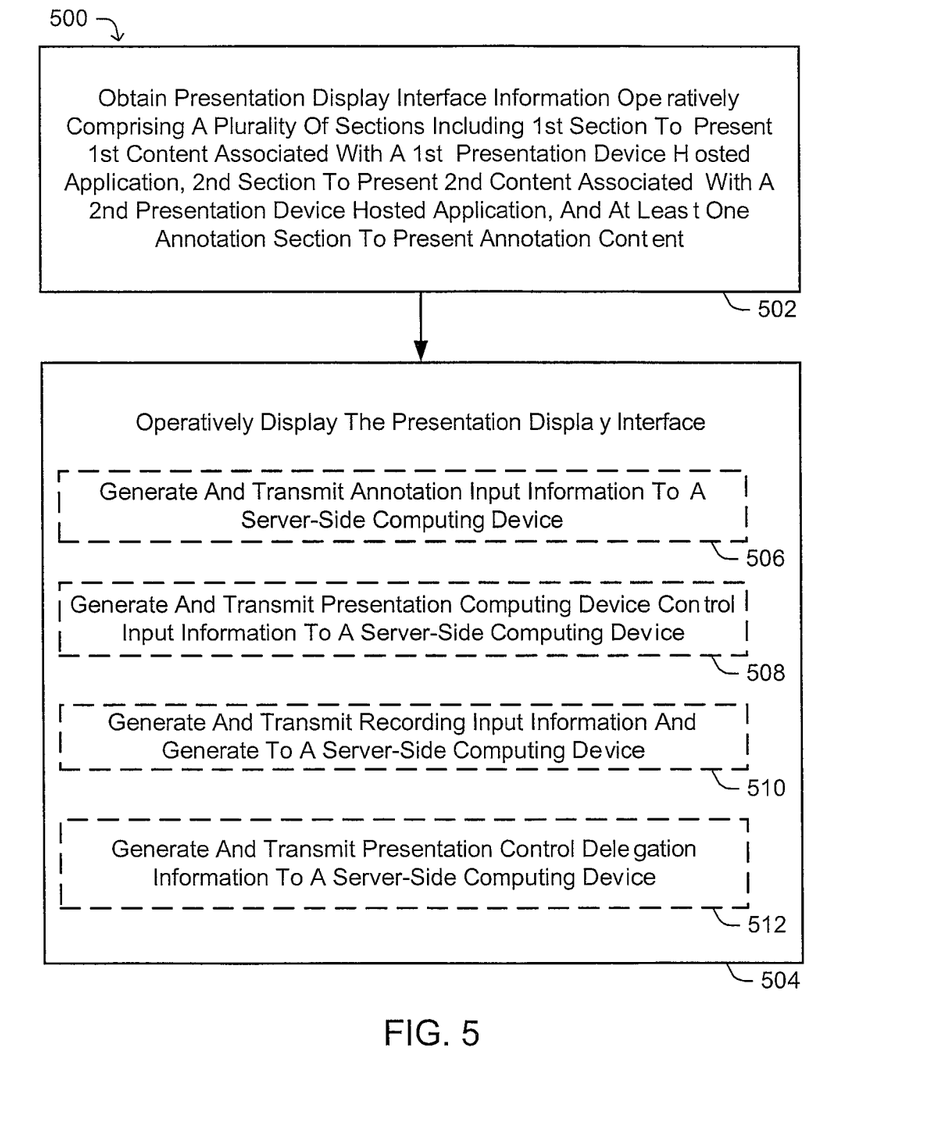
FIG. 5 is a flow diagram illustrating an exemplary process for use in an exemplary client-side or other like computing device to provide at least a portion of a presentation service for sharing content from multiple applications along with selective annotation input, in accordance with certain implementations.

Reference is now made to FIG. 5, which is a flow-diagram illustrating an example process 500 that may be implemented by one or more client-side computing devices, for example, as in FIG. 1.

At block 502, one or more electronic signals representing a presentation display interface may be obtained. Here, for example, such presentation display interface upon rendering and display may comprise a plurality of sections including at least: a first section in which first content associated with a first presentation computing device hosted application is presented; a second section in which second content associated with a second presentation computing device hosted application is presented; and at least one annotation section in which annotation content associated with the one or more client-side computing devices is presented. Here, the annotation section may overlap at least a portion of each at least the first and second sections. At block 504, the presentation display interface may be operatively displayed. For example, such presentation display interface may be operatively displayed in a graphical user interface (GUI). In certain implementations, such presentation display interface may take the form of a hypertext or other like document(s)/file(s) that may be operatively displayed using a browser and/or other like application.

At block 506 in block 504, in certain example implementations, a client-side computing device may generate and transmit one or more electrical signals representing annotation input information input to at least one server-side computing device via a communication network. Here, for example, such annotation input information may be selectively operatively input via the presentation display interface.

At block 508 in block 504, in certain example implementations, a client-side computing device may generate and transmit one or more electrical signals representing presentation computing device control input information to at least one server-side computing device via a communication network. Here, for example, such presentation computing device control input information may be selectively operatively input via the presentation display interface.

At block 510 in block 504, in certain example implementations, a client-side computing device may generate and transmit one or more electrical signals representing recording input information to at least one server-side computing device via a communication network. Here, for example, such recording input information may be selectively operatively input via the presentation display interface.

At block 512 in block 504, in certain example implementations, a client-side computing device may generate and transmit one or more electrical signals representing presentation control delegation information to at least one server-side computing device via a communication network. Here, for example, such presentation control delegation information may be selectively operatively input via the presentation display interface.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

The methodologies described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating,", "identifying", "determining", "establishing", "obtaining", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method for use in a computing environment, the method comprising:
   with at least one network-based computing device:
      generating, by a network-based presentation service, a combined presentation display that is displayable via one or more participant computing devices, said combined presentation display comprising a plurality of sections including at least: a first section to present first content received from a first presentation computing device hosted application; a second section to present second content received from a second presentation computing device hosted application; and an annotation section to present annotation content received from one or more of said one or more participant computing devices, and wherein said annotation section overlaps at least a portion of each of said first and second sections;
      wherein said generating comprises said network-based presentation service combining, in the first section, the second section, and the annotation section respectively, content from the first presentation computing device hosted application, content from the second presentation computing device hosted application, and annotation content from one of said one or more participant computing devices to generate the combined presentation display before sending the combined presentation display to said one or more participant computing devices; and
      sending, by the presentation service, said combined presentation display including the first section, the second section, and the annotation section to said one or more participant computing devices via one or more communication networks connecting the network-based presentation service to the one or more participant computing devices.

2. The method as recited in claim 1, further comprising, with said at least one network-based computing device:
   obtaining annotation input information received from said combined presentation display as displayed using at least one of said one or more participant computing devices; and
   generating annotation content based, at least in part, on said annotation input information.

3. The method as recited in claim 1, further comprising, with said at least one network-based computing device:
   obtaining presentation computing device control input information received from said combined presentation display as displayed using at least one of said one or more participant computing devices;
   generating at least one presentation computing device control input received from at least one of said first and/or second presentation computing devices based, at least in part, on said presentation computing device control input information; and
   providing said at least one presentation computing device control input to at least one of said first and/or second presentation computing devices.

4. The method as recited in claim 3, wherein obtaining said presentation computing device control input information comprises obtaining scripted input information.

5. The method as recited in claim 1, further comprising, with said at least one network-based computing device:
   obtaining recording input information received from said combined presentation display as displayed using at least one of said one or more participant computing devices; and
   in response to said recording input information, generating at least one scripted input information file comprising at least one presentation computing device control input received from at least one of said first and/or second presentation computing devices.

6. The method as recited in claim 1, further comprising, with said at least one network-based computing device:
   obtaining recording input information received from said combined presentation display as displayed using at least one of said one or more participant computing devices; and
   in response to said recording input information, generating at least one recorded presentation file received from at least one of said plurality of sections of said combined presentation display.

7. The method as recited in claim 1, wherein said one or more participant computing devices comprises a plurality of participant computing devices and further comprising, with said at least one network-based computing device:
   obtaining presentation control delegation information received from said combined presentation display as displayed using at least one of said one or more participant computing devices; and
   in response to said presentation control delegation information, limiting control of at least one control feature of said combined presentation display to a subset of said plurality of participant computing devices.

8. An apparatus, comprising:
   a network interface; and
   at least one processing unit coupled to said network interface and programmed with instructions to:
      generate, by a networked-based presentation service, a combined presentation display that is displayable via one or more participant computing devices, said combined presentation display comprising a plurality of sections including at least: a first section to present first content received from a first presentation computing device hosted application; a second section to present second content received from a second presentation computing device hosted application; and an annotation section to present annotation content received from said one or more participant computing devices, and wherein said annotation section overlaps at least a portion of each of said first and second sections;
      wherein to generate the combined presentation display said instructions cause the network-based presentation service to combine, in the first section, the second section, and the annotation section respectively, content from the first presentation computing device hosted application, content from the second presentation computing device hosted application, and annotation content from one of said one or more participant computing devices to generate the combined presentation display before sending the combined presentation display to said one or more participant computing devices; and send, by the network-based presentation service, communication of said combined presentation display including the first section, the second section, and the annotation section to one or more participant computing devices via said network interface connecting the network-based presentation service to the one or more participant computing devices.

9. The apparatus as recited in claim 8, said at least one processing unit being further programmed with instructions to:

obtain annotation input information received from said combined presentation display as displayed using at least one of said one or more participant computing devices; and generate said annotation content based, at least in part, on said annotation input information.

10. The apparatus as recited in claim 8, said at least one processing unit being further programmed with instructions to:

obtain presentation computing device control input information received from said combined presentation display as displayed using at least one of said one or more participant computing devices;

generate at least one presentation computing device control input received from at least one of said first and/or second presentation computing devices based, at least in part, on said presentation computing device control input information; and initiate communication of said at least one presentation computing device control input to at least one of said first and/or second presentation computing devices.

11. The apparatus as recited in claim 10, further comprising:

memory coupled to said at least one of said processing unit and/or network interface; and wherein said at least one processing unit is further programmed with instructions to:

obtain said presentation computing device control input information from scripted input information stored in said memory; and/or use scripted input information to initialize said combined presentation display to a desired state.

12. The apparatus as recited in claim 8, further comprising:

memory coupled to said at least one of said processing unit and/or network interface, and wherein said at least one processing unit is further programmed with instructions to:

obtain recording input information received from said combined presentation display as displayed using at least one of said one or more participant computing devices;

in response to said recording input information, generate at least one scripted input information file comprising at least one presentation computing device control input received from at least one of said first and/or second presentation computing devices; and send communication of said at least one scripted input information file to said memory for storage therein.

13. The apparatus as recited in claim 8, further comprising:

memory coupled to said at least one of said processing unit and/or network interface, and wherein said at least one processing unit is further programmed with instructions to:

obtain recording input information received from said combined presentation display as displayed using at least one of said one or more participant computing devices;

in response to said recording input information, generate at least one recorded presentation file received from at least one of said plurality of sections of said combined presentation display; and initiate communication of said at least one recorded presentation file to said memory for storage therein.

14. The apparatus as recited in claim 8, wherein said one or more participant computing devices comprises a plurality of participant computing devices, and wherein said at least one processing unit is further programmed with instructions to:

obtain presentation control delegation information received from said combined presentation display as displayed using at least one of said one or more participant computing devices; and in response to said presentation control delegation information, limit control of at least one control feature of said combined presentation display to a subset of said plurality of participant computing devices.

15. An article, comprising:

a computer readable medium having computer implementable instructions stored thereon that in response to being executed by one or more processing units in an electronic device enable the electronic device to:

generate, by a network-based presentation service, a combined presentation display that is displayable via one or more participant computing devices, said combined presentation display comprising a plurality of sections including at least: a first section to present first content received from a first presentation computing device hosted application; a second section to present second content received from a second presentation computing device hosted application; and an annotation section to present annotation content received from said one or more participant computing devices, and wherein said annotation section overlaps at least a portion of each of said first and second sections;

wherein to generate the combined presentation display said instructions cause the network-based presentation service to combine, in the first section, the second section, and the annotation section respectively, content from the first presentation computing device hosted application, content from the second presentation computing device hosted application, and annotation content from one of said one or more participant computing devices to generate the combined presentation display before sending the combined presentation display to said one or more participant computing devices; and send, by the network-based presentation service, transmission of said combined presentation display including the first section, the second section, and the annotation section to said one or more participant computing devices via one or more communication networks connecting the network-based presentation service to the one or more participant computing devices.

16. The article as recited in claim 15, wherein the computer implementable instructions in response to being executed by the one or more processing units in the electronic device further enable the electronic device to obtain annotation input information received from said combined presentation display as displayed using at least one of said one or more participant computing devices, and generate said annotation content based, at least in part, on said annotation input information.

17. The article as recited in claim 15, wherein the computer implementable instructions in response to being executed by the one or more processing units in the electronic device further enable the electronic device to:
- obtain presentation computing device control input information received from said combined presentation display as displayed using at least one of said one or more participant computing devices; and
- generate at least one presentation computing device control input received from at least one of said first and/or second presentation computing devices based, at least in part, on said presentation computing device control input information; and
- initiate transmission of said at least one presentation computing device control input to at least one of said first and/or second presentation computing devices.

18. The article as recited in claim 17, wherein the computer implementable instructions in response to being executed by the one or more processing units in the electronic device further enable the electronic device to obtain said presentation computing device control input information from scripted input information.

19. The article as recited in claim 15, wherein the computer implementable instructions in response to being executed by the one or more processing units in the electronic device further enable the electronic device to:
- obtain recording input information received from said combined presentation display as displayed using at least one of said one or more participant computing devices; and
- in response to said recording input information at least one of:
  - generate at least one scripted input information file comprising at least one presentation computing device control input received from at least one of said first and/or second presentation computing devices, and/or
  - generate at least one recorded presentation file received from at least one of said plurality of sections of said combined presentation display.

20. The article as recited in claim 15, wherein said one or more participant computing devices comprises a plurality of participant computing devices, and wherein the computer implementable instructions in response to being executed by the one or more processing units in the electronic device further enable the electronic device to:
- obtain presentation control delegation information received from said combined presentation display as displayed using at least one of said one or more participant computing devices; and
- in response to said presentation control delegation information, limit control of at least one control feature of said combined presentation display to a subset of said plurality of participant computing devices.

* * * * *